United States Patent
Yasumura et al.

(10) Patent No.: US 10,146,020 B1
(45) Date of Patent: Dec. 4, 2018

(54) MEMS STEERING MIRRORS FOR APPLICATIONS IN PHOTONIC INTEGRATED CIRCUITS

(71) Applicant: Google LLC, Mountain View, CA (US)

(72) Inventors: Kevin Y. Yasumura, Lafayette, CA (US); Lieven Verslegers, San Francisco, CA (US); Jill D. Berger, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/634,632

(22) Filed: Jun. 27, 2017

Related U.S. Application Data

(60) Provisional application No. 62/512,626, filed on May 30, 2017.

(51) Int. Cl.
　　*G02B 6/12* (2006.01)
　　*G02B 6/42* (2006.01)
　　*G02B 6/124* (2006.01)

(52) U.S. Cl.
　　CPC ........... *G02B 6/4214* (2013.01); *G02B 6/124* (2013.01); *G02B 2006/12061* (2013.01); *G02B 2006/12102* (2013.01); *G02B 2006/12104* (2013.01); *G02B 2006/12121* (2013.01); *G02B 2006/12123* (2013.01); *G02B 2006/12147* (2013.01); *G02B 2006/12157* (2013.01)

(58) Field of Classification Search
　　CPC .................................................. G02B 6/12033
　　See application file for complete search history.

(56) References Cited

U.S. PATENT DOCUMENTS

| 4,952,056 | A | 8/1990 | Tiefenthaler | |
| 6,525,296 | B2 * | 2/2003 | Matsushima | .......... B23K 26/08 |
| | | | | 219/121.69 |
| 6,580,858 | B2 * | 6/2003 | Chen | ........................ G02B 6/35 |
| | | | | 385/48 |

(Continued)

FOREIGN PATENT DOCUMENTS

| WO | 2012015596 A1 | 2/2012 |
| WO | 2016011002 A1 | 1/2016 |

OTHER PUBLICATIONS

Koev, Stephan T., et al. "An Efficient Large-Area Grating Coupler for Surface Plasmon Polaritons", Plasmonics, vol. 7, Issue 2, pp. 269-277, Jun. 2012.

(Continued)

*Primary Examiner* — Rhonda S Peace
(74) *Attorney, Agent, or Firm* — McDermott Will & Emery LLP

(57) ABSTRACT

An integrated optical assembly includes an optics mount. The optics mount has disposed thereon a light source for providing a beam of light and a lens configured to focus the beam of light. The integrated optical assembly includes a photonic integrated circuit (PIC) mechanically coupled to the optics mount. The PIC has disposed thereon a grating coupler for receiving the beam of light and coupling the beam of light into a waveguide. The integrated optical assembly includes a microelectromechanical systems (MEMS) mirror configured to receive the beam of light from the lens and redirect it towards the grating coupler. A position of a reflective portion of the MEMS mirror is adjustable to affect an angle of incidence of the beam of light on the grating coupler.

19 Claims, 6 Drawing Sheets

(56) References Cited

U.S. PATENT DOCUMENTS

| | | | |
|---|---|---|---|
| 6,826,211 B2* | 11/2004 | Tatsuno | H01S 5/0687 |
| | | | 372/28 |
| 7,835,065 B2* | 11/2010 | Almoric | G01B 11/272 |
| | | | 359/326 |
| 9,244,231 B2* | 1/2016 | Arimoto | H01S 5/12 |
| 9,632,281 B2* | 4/2017 | Miao | G02B 7/02 |
| 9,935,424 B2* | 4/2018 | Zheng | H01S 5/0228 |
| 2006/0067606 A1 | 3/2006 | Towle et al. | |
| 2006/0227833 A1 | 10/2006 | O'Daniel et al. | |
| 2006/0239612 A1* | 10/2006 | De Dobbelaere | G02B 6/42 |
| | | | 385/37 |
| 2007/0160321 A1 | 7/2007 | Wu et al. | |
| 2009/0074358 A1* | 3/2009 | Itagi | G02B 6/34 |
| | | | 385/37 |
| 2012/0195332 A1 | 8/2012 | Yoffe et al. | |
| 2014/0153605 A1 | 6/2014 | Arimoto et al. | |
| 2015/0268421 A1 | 9/2015 | Higuchi et al. | |
| 2015/0318952 A1 | 11/2015 | Butrie et al. | |
| 2016/0149662 A1 | 5/2016 | Soldano et al. | |
| 2016/0294155 A1* | 10/2016 | Zheng | H01S 5/0228 |
| 2016/0377821 A1* | 12/2016 | Vallance | G02B 6/4248 |
| | | | 385/28 |
| 2017/0299860 A1* | 10/2017 | Wall | G02B 27/0081 |

OTHER PUBLICATIONS

Nellen, Ph. M, et al. "Integrated Optical Input Grating Couplers as Biochemical Sensors", Sensors and Actuators, vol. 15, pp. 285-295, Nov. 1988.

Roelkens, G., et al. "Grating-based optical fiber interfaces for silicon-on-insulator photonic integrated circuits," IEEE Journal of Selected topics in quantum Electronics, vol. 17, No. 3, pp. 571-580, May 2011.

International Search Report and Written Opinion dated May 16, 2018 in International (PCT) Application No. PCT/US2018/022013.

Extended European Search Report dated Jun. 6, 2018 in European Patent Application No. 18166654.6.

Combined Search and Examination Report dated Sep. 3, 2018 in United Kingdom Patent Application No. 1804241.6 (7 pages).

* cited by examiner

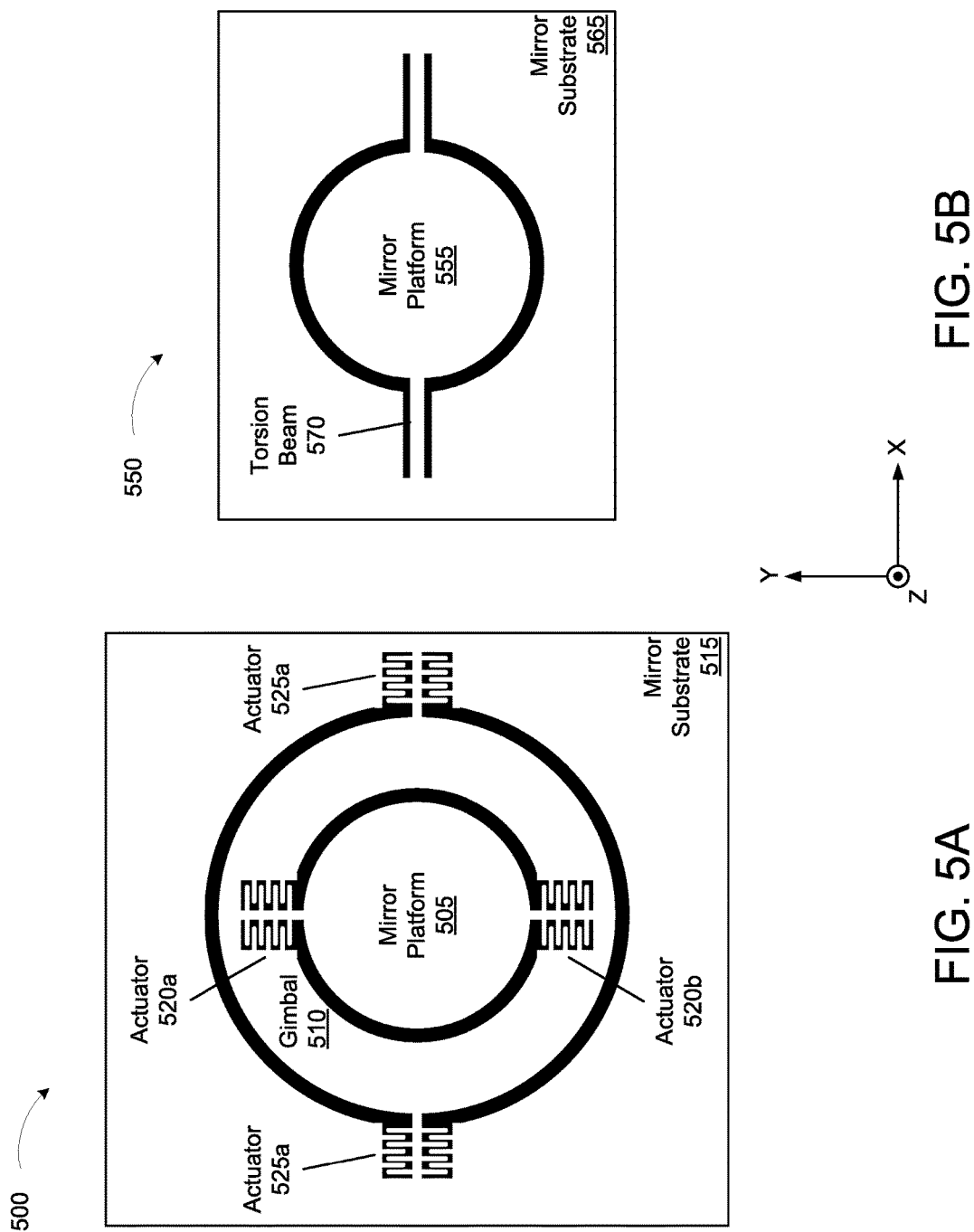

600 

Provide an optics tray having disposed thereon a light source for providing a beam of light and a lens configured to focus the beam of light
610

Provide a photonic integrated circuit (PIC) having disposed thereon a grating coupler for receiving the beam of light and coupling the beam of light into a waveguide
620

Provide a microelectromechanical systems (MEMS) mirror configured to receive the beam of light from the lens and redirect it towards the grating coupler, wherein the MEMS mirror includes an actuator for adjusting a position of the MEMS mirror to affect an angle of incidence of the beam of light on the grating coupler
630

Assemble the optics tray, the MEMS mirror, and the PIC into the integrated optical assembly
640

Calibrate the position of the MEMS mirror to increase coupling of the beam of light into the waveguide
650

FIG. 6

MEMS STEERING MIRRORS FOR APPLICATIONS IN PHOTONIC INTEGRATED CIRCUITS

RELATED APPLICATIONS

The present application claims the benefit of and priority to U.S. Provisional Patent Application No. 62/512,626, titled "MEMS STEERING MIRRORS FOR APPLICATIONS IN PHOTONIC INTEGRATED CIRCUITS," and filed on May 30, 2017, the entire contents of which are hereby incorporated by reference.

BACKGROUND

Optical communications use modulated light beams to convey information through optical fibers, free space, or waveguides. A beam of light can be modulated either directly by modulating current to a light source, or externally by using an optical modulator to modulate a continuous-wave light beam produced by the light source. External modulation has advantages in that it can handle higher power and frequencies; however, the required components can be larger, more complex, and more expensive.

SUMMARY

At least one aspect is directed to an integrated optical assembly. The integrated optical assembly includes an optics mount having disposed thereon a light source for providing a beam of light and a lens configured to focus the beam of light. The integrated optical assembly includes a photonic integrated circuit (PIC) mechanically coupled to the optics mount and having disposed thereon a grating coupler for receiving the beam of light and coupling the beam of light into a waveguide. The integrated optical assembly includes a microelectromechanical systems (MEMS) mirror configured to receive the beam of light from the lens and redirect it towards the grating coupler. A position of a reflective portion of the MEMS mirror is adjustable to affect an angle of incidence of the beam of light on the grating coupler.

In some implementations, the grating coupler includes silicon.

In some implementations, the optics mount includes silicon with an anti-reflective coating on at least one surface.

In some implementations, the light source is a distributed feedback laser. In some implementations, the integrated optical assembly can include an optical isolator disposed on the optics mount and configured to receive the beam of light from the lens and pass it in a first direction towards the MEMS mirror while preventing light from passing through it in a second direction opposite the first direction.

In some implementations, the integrated optical assembly can include a monitor photodiode disposed on the PIC for measuring an amplitude of light coupled into the waveguide.

In some implementations, the MEMS mirror is movable to adjust the angle of incidence from zero degrees from normal to a light-receiving surface of the grating coupler, to 20 degrees from normal.

In some implementations, the integrated optical assembly has dimensions suitable for inclusion in an optical transceiver device.

In some implementations, the MEMS mirror can rotate in two dimensions.

In some implementations, the MEMS mirror includes an actuator for adjusting the position of the reflective portion.

In some implementations, the MEMS mirror is configured to be continually or periodically repositioned throughout a service life of the integrated optical assembly.

At least one aspect is directed to an optical communications system. The optical communications system includes an optics mount having disposed thereon a light source for providing beam of light and a lens configured to focus the beam of light. The optical communications system includes a photonic integrated circuit (PIC) mechanically coupled to the optics mount. The PIC has disposed thereon a grating coupler for receiving the beam of light and coupling the beam of light into a waveguide, and a monitor photodiode for measuring an amplitude of light coupled into the waveguide. The optical communications system includes a microelectromechanical systems (MEMS) mirror configured to receive the beam of light from the lens and redirect it towards the grating coupler. A position of a reflective portion of the MEMS mirror is adjustable to affect an angle of incidence of the beam of light on the grating coupler. The optical communications system includes a controller configured to receive an indication of the amplitude of the light coupled into the waveguide and control the position of the MEMS mirror to increase the indication of the amplitude.

At least one aspect is directed to a method of manufacturing an integrated optical assembly. The method includes providing an optics mount having disposed thereon a light source for providing beam of light and a lens configured to focus the beam of light. The method includes providing a photonic integrated circuit (PIC) having disposed thereon a grating coupler for receiving the beam of light and coupling the beam of light into a waveguide. The method includes providing a microelectromechanical systems (MEMS) mirror configured to receive the beam of light from the lens and redirect it towards the grating coupler. A position of a reflective portion of the MEMS mirror is adjustable to affect an angle of incidence of the beam of light on the grating coupler. The method includes assembling the optics mount, the MEMS mirror, and the PIC into the integrated optical assembly.

In some implementations, the method can include providing a modulator on the PIC for modulating light coupled into the waveguide.

In some implementations, the method can include providing a monitor photodiode on the PIC; and measuring, using the monitor photodiode, an amplitude of light coupled into the waveguide. In some implementations, the method can include calibrating the position of the MEMS mirror to increase coupling of the beam of light into the waveguide.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5A is a diagram of a two-axis microelectromechanical system (MEMS) mirror assembly for use in an integrated optical assembly, according to an illustrative implementation;

FIG. 5B is a diagram of a single-axis microelectromechanical system (MEMS) mirror assembly for use in an integrated optical assembly, according to an illustrative implementation; and FIG. 6 is a flowchart of an example method of manufacturing an integrated optical assembly, according to an illustrative implementation.

DETAILED DESCRIPTION

Figures 1A, 1B:
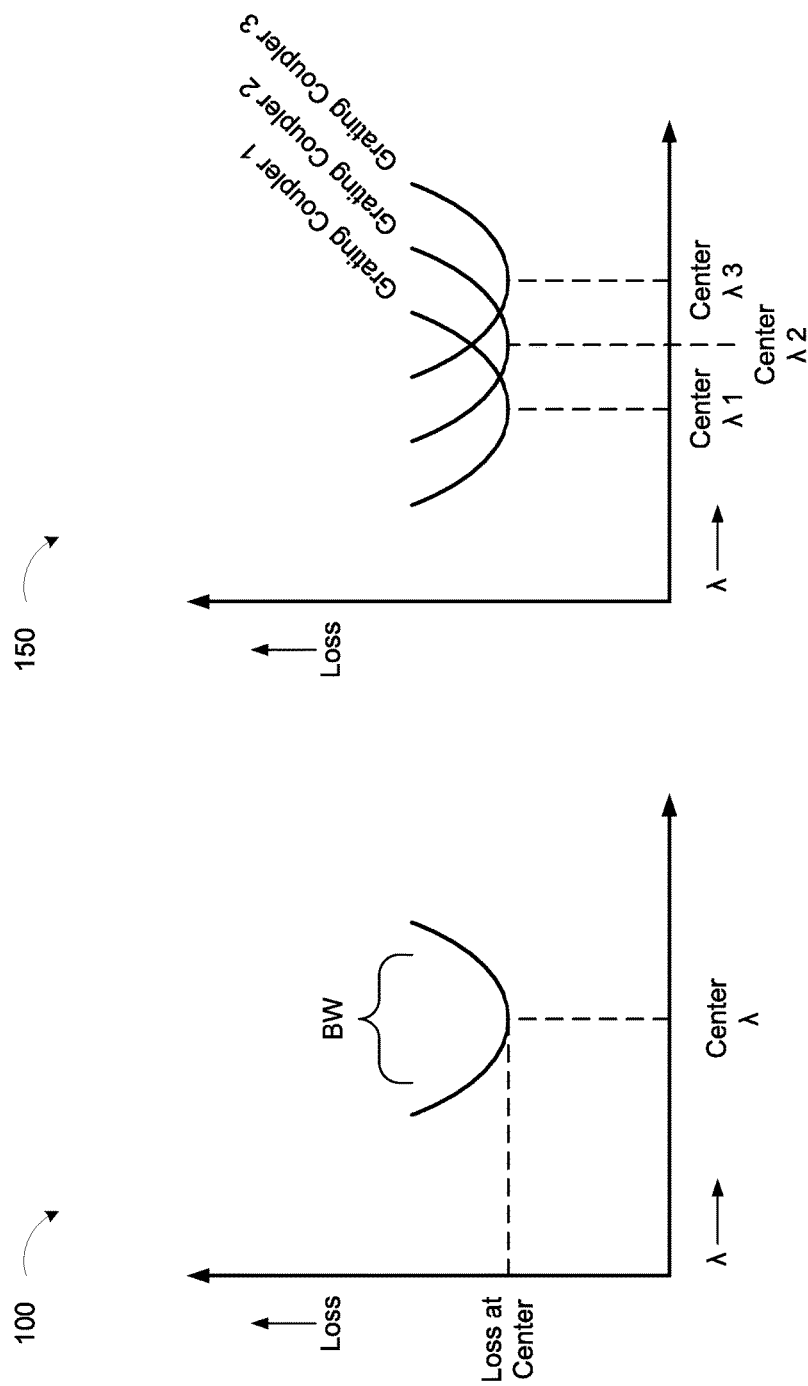
FIG. 1A is a graph of an example relationship of loss versus wavelength for coupling light into an optical grating coupler.
FIG. 1B is a graph of example relationships of loss versus wavelength for coupling light into three different optical grating couplers.

This disclosure generally relates to an integrated optical assembly for coupling a beam of light into a photonic integrated circuit (PIC) using an adjustable mirror. The assembly can include the laser light source, optical components such as a lens and an optical isolator, the mirror, and a PIC having an optical grating coupler for coupling the laser into the PIC. The PIC can include a waveguide to receive the light from the grating coupler. The PIC can additionally include power splitters, monitor photodiodes, and a modulator for modulating the light.

A grating coupler is an optical device that can couple light traveling in free space or an optical fiber into a waveguide (or vice-versa). The grating coupler is a diffractive element with a limited optical bandwidth over which it can efficiently couple light into or out of the waveguide. Furthermore, optical grating couplers with large mode field diameters may have even narrower bandwidths. Process variations in the fabrication of the grating coupler can result in variation of the center wavelength from one grating coupler to another. In addition, the angle of incidence of light impinging on the grating coupler also affects the center wavelength; e.g., a steeper angle of incidence may result in a shorter center wavelength. Process variations in the assembly can also affect the angle of incidence of light on the grating coupler. Such process variations can include, for example and without limitation, position of the light source, lens, mirror, and grating coupler. In addition, the wavelength of light generated by the light source itself may vary. For example and without limitation, optical communication systems using wavelength-division multiplexing may employ wavelengths ranging from 1260 to 1340 nm.

An integrated optical assembly can compensate for the variations in processes and light wavelength by taking advantage of the relationship between center wavelength of the grating coupler and the angle of incidence of light impinging on the grating coupler. For example, instead of a fixed reflector such as a prism, mirror, or polished fiber tip, the integrated optical assembly can include an adjustable mirror for redirecting the laser onto the grating coupler. The adjustable mirror can be a microelectromechanical system (MEMS) mirror that can be adjusted using, for example, electrostatic actuators controlled by a controller using feedback from a monitor photodiode on the PIC. In some implementations, the mirror can include other small form-factor mirrors; for example, the mirror can include a reflective surface glued or otherwise affixed to one or more laser-cut sheet metal shims. In some implementations, the mirror can remain free to move for the service life of the assembly such that future adjustments can be made.

Use of a MEMS mirror allows for miniaturization of the integrated optical assembly. The size of the entire integrated optical assembly can be on the order of a few millimeters in its longest dimension. This can make the integrated optical assembly appropriate for use in, for example, a data communications transceiver. In addition, the presence of the MEMS mirror allows the other components to be fixed to each other in a mass production environment, with alignment adjustments to be made using the mirror. This allows for a simpler fabrication process with wider tolerances, which can reduce the overall cost of the device.

FIG. 1A is a graph 100 of an example relationship of loss versus wavelength for light coupling into an optical grating coupler. Optical grating couplers can be used to couple light traveling in free space or an optical fiber into a waveguide, and vice-versa. Optical grating couplers are therefore useful in optical communications for coupling light into and out of photonic integrated circuits (PICs) in optical transmitters, receivers, and transceivers. An optical grating coupler may include surface features such as lines or ridges that create an interface suitable for receiving or emitting an optical signal. Such an optical grating coupler is a resonant device; therefore, it will couple optical signals of a certain bandwidth around a center wavelength. The center wavelength and bandwidth are functions of the dimensions of the surface features of the optical grating coupler.

The graph 100 illustrates an example relationship of loss versus wavelength for coupling light into an optical grating coupler. The wavelength at which the grating coupler is most efficient—i.e., least lossy—is referred to as the center wavelength. The grating coupler can couple light with a reasonable efficiency across a finite bandwidth (BW) around the center wavelength. The bandwidth can be defined as a range of wavelengths of light over which coupling loss is less than, for example, 1 dB, 3 dB, or 6 dB greater than the coupling loss at the center wavelength.

FIG. 1B is a graph 150 of example relationships of loss versus wavelength for coupling light into three different optical grating couplers. Because optical grating couplers are resonant devices with a center wavelength that depends on its surface features, process variations in the fabrication of optical grating couplers can result in variation of the center wavelength from one optical grating coupler to another. The graph 150 illustrates example relationships of loss versus wavelength for optical grating couplers 1, 2, and 3. For example, grating coupler 1 has a center wavelength 1, grating coupler 2 has a center wavelength 2, and grating coupler 3 has a center wavelength 3. Thus, even though optical grating couplers may be manufactured for a particular wavelength, process variation can result in optical grating couplers having center wavelengths that vary from the desired wavelength. For example, the pitch or spacing of the surface features can affect the resonant behavior of the optical grating coupler, and thus the center wavelength. Without a way to compensate for the center wavelength variation among optical grating couplers, the devices employing them may not operate as efficiently as they could.

Figure 2:
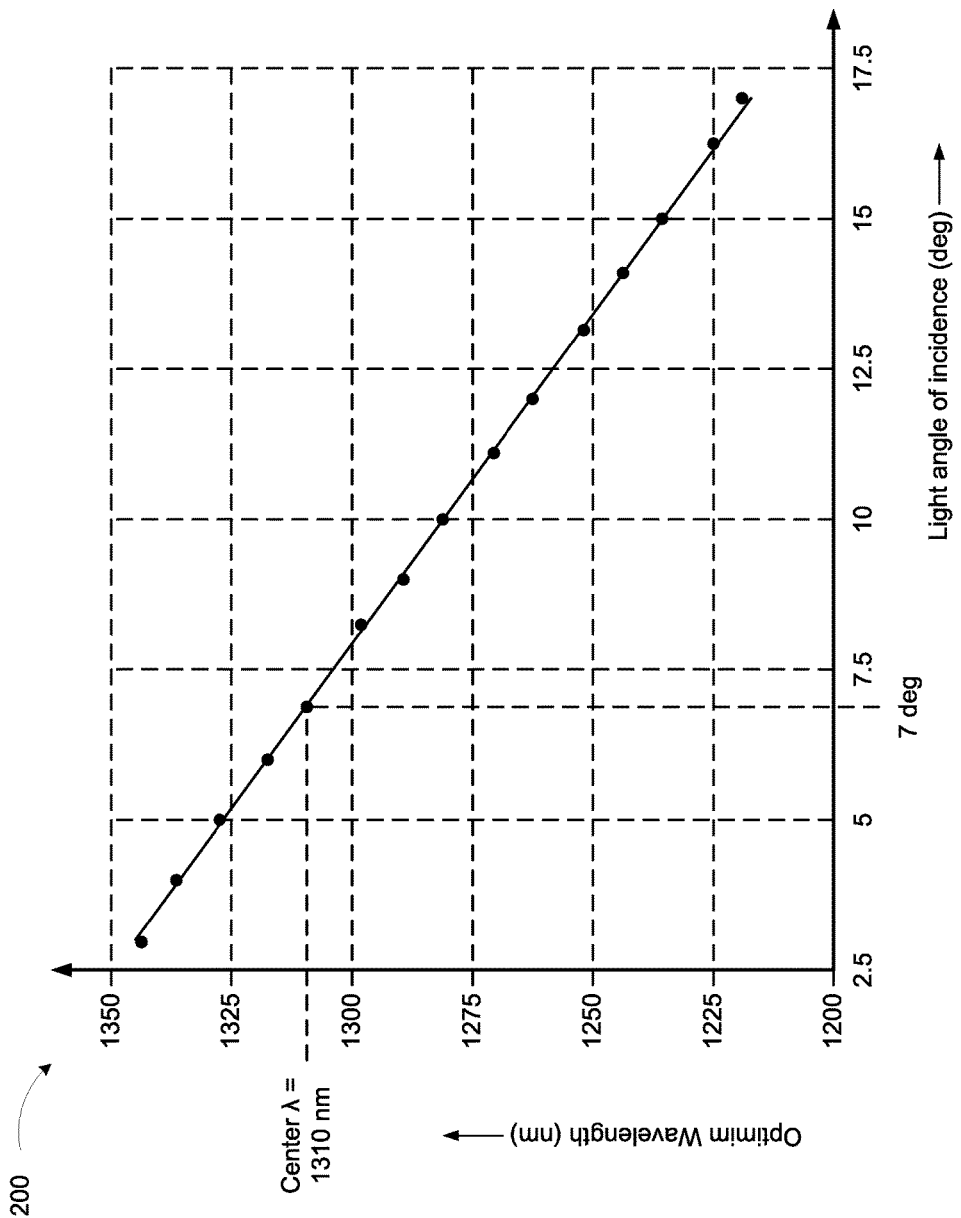
FIG. 2 is a graph of an example relationship of optimum wavelength versus angle of incidence for coupling light into an optical grating coupler.

FIG. 2 is a graph 200 of an example relationship of optimum wavelength versus angle of incidence for coupling light into an optical grating coupler. The graph 200 shows that the center wavelength for optimum coupling of light into an optical grating coupler can vary based on the angle of incidence. For example, at an angle of incidence of 5 degrees from normal to the surface of the optical grating coupler, the optimum (center) wavelength for efficient coupling of light will be approximately 1325 nm. At an angle of incidence of 15 degrees, the optimum wavelength will be approximately 1235 nm. This relationship between angle of incidence and center wavelength can lead to an additional source of variation in center wavelength among devices. For example, the relative positioning of the optical grating coupler, light source, lens, and mirror can affect the angle of incidence, and thus the center wavelength of the system. Slight variations in the alignment of the lens from device to device can result in variations in the angle of incidence of the beams of light on the respective optical grating couplers. The variation in the angle of incidence among devices should, all things being equal, result in a corresponding variation in the center wavelength of each device, even though each device is manufactured to operate at the same center wavelength.

The graph 200 shows, however, that the relationship between the angle of incidence and the optimum wavelength behaves substantially linearly. This relationship can therefore be exploited to adjust the angle of incidence and potentially compensate for variations in grating coupler surface features and the relative positions of system components. For example, the system can include a moveable mirror or reflector. The mirror angle can be adjusted to set the angle of incidence of light impinging on the grating coupler. The mirror angle can therefore be adjusted to set the angle of incidence in a manner that tunes the center wavelength of the system to the desired wavelength. For example, in some implementations, the wavelength of the light beam is 1310 nm. Using the example measurements in the graph 200, the center wavelength of the system can be set to 1310 nm by adjusting the mirror such that the angle of incidence of light on the optical grating coupler is roughly 7 degrees. The exact angle of incidence for efficient coupling of light into the optical grating coupler may depend on the dimensions of the grating coupler surface features. Similarly, the mirror angle to achieve the desired angle of incidence may depend on the relative position of other components of the integrated optical assembly. In both cases, the angle of the mirror can be used to optimize the angle of incidence for efficient coupling at the center wavelength. The graph 200 represents just one example of a relationship between angle of incidence and optimum wavelength. Other grating couplers will exhibit different relationships depending on their geometry and physical properties.

Figure 3:
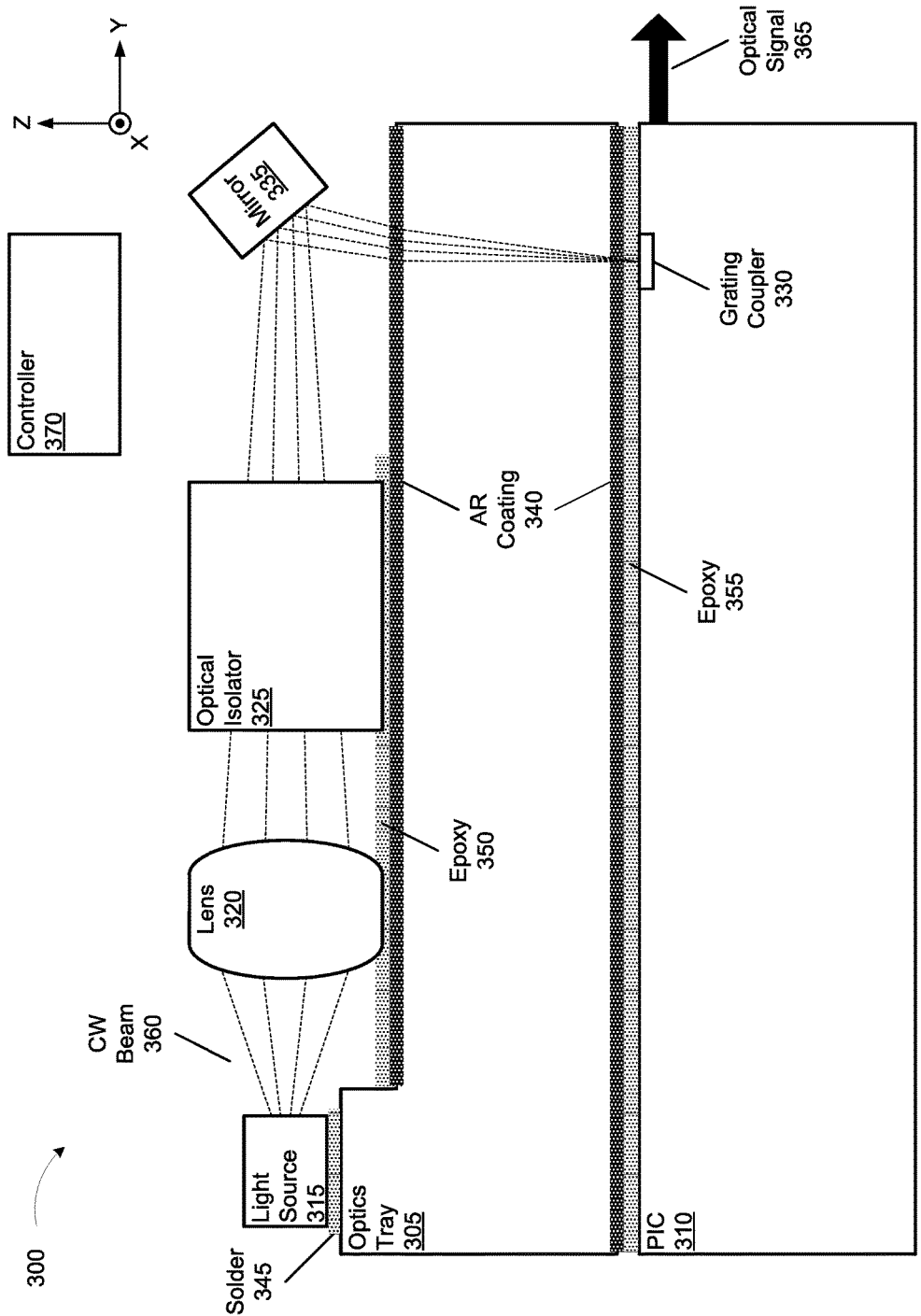
FIG. 3 is a block diagram of an integrated optical assembly, according to an illustrative implementation.

FIG. 3 is a block diagram of an integrated optical assembly 300, according to illustrative implementations. The assembly 300 includes an optics mount 305 and a photonic integrated circuit (PIC) 310. The optics mount 305 has disposed thereon a light source 315, a lens 320, and, in some implementations, an optical isolator 325. The PIC 310 includes an optical grating coupler 330. The assembly 300 includes a microelectromechanical system (MEMS) mirror 335 mounted to either or both of the optics mount 305 and the PIC 310. The integrated optics assembly 300 can function as an externally modulated laser, providing a modulated optical signal 365. A controller 370 can execute certain operations of the integrated optical assembly 300 such as controlling a position of a reflective portion of the mirror 335. For example and without limitation, the controller 370 can be used to adjust or optimize light coupling over the lifetime of the device, including adjusting to compensate for thermal expansion or contraction of components of the integrated optical assembly 300.

In some implementations, the optics mount 305 can include silicon or be fabricated from one or more silicon blocks or wafers. In some implementations, the optics mount 305 can include an antireflective (AR) coating 340 on a top and/or bottom side in regions passing a light beam 360. The AR coating can include a multi-layer hard oxide coating that includes silicon dioxide ($SiO_2$) and hafnium dioxide ($HfO_2$). The light source 315 can be mounted to the optics mount 305 with solder 345; for example, gold/tin solder. The lens 320 and optical isolator 325 can be mounted to the optics mount 305 with a layer of epoxy 350. The optics mount 305 can itself be mounted to the PIC 310 with a layer of epoxy 355. The epoxy can be of a type having high transparency. For example, in some implementations, the epoxy can be a UV-curable optical path link up epoxy.

In some implementations, the optics mount 305 can be between approximately 2.5 mm and 5 mm long. In some implementations, the optics mount 305 can be approximately 3.5 mm long. In some implementations, the optics mount 305 can be between approximately 0.5 mm to 1.25 mm wide. In some implementations, the optics mount 305 can be approximately 0.75 mm wide. In some implementations, the optics mount 305 can be between approximately 0.5 mm to 1.5 mm tall. In some implementations, the optics mount 305 can be approximately 1 mm tall. In some implementations, the optics mount 305 can include two wafers: the first wafer extending the length of the optics mount 305, and a second wafer under the region of the light source 315 to align the output of the light source 315 with the axis of the lens 320. In some implementations, the first wafer can be between approximately 0.4 mm and 0.7 mm. In some implementations, the first wafer can be approximately 0.5 mm tall. In some implementations, the second wafer can be between approximately 0.1 mm and 0.25 mm tall. In some implementations, the second wafer can be approximately 0.15 mm tall. The lens 320 and optical isolator 325 can extend above the height of the first wafer of the optics mount 305. In some implementations, the lens 320 and optical isolator 325 can add between approximately 0.3 mm and 0.8 mm in height above the first wafer of the optics mount 305. In some implementations, the lens 320 and optical isolator 325 can add approximately 0.5 mm in height above the first wafer of the optics mount 305.

In some implementations, the PIC 310 can be between approximately 0.75 mm and 1.25 mm tall. In some implementations, the PIC 310 can be approximately 1 mm tall. In some implementations, the PIC 310 can be less than or equal to 0.75 mm tall. In some implementations, the PIC 310 can be between approximately 2.5 mm and 6 mm long. In some implementations, the PIC 310 can be approximately 4 mm long. In some implementations, the PIC 310 can be between approximately 0.75 mm and 1.25 mm wide. In some implementations, the PIC 310 can be approximately 1.0 mm wide. These dimensions of the components of the integrated optical assembly 300 can allow it to fit into a typical data communications transceiver module.

The light source 315 can produce a continuous-wave beam of light 360 with a narrow bandwidth. In some implementations, the light source 315 can be a laser diode in die form. In some implementations, the diode die can be mounted p-side down. In some implementations, the diode die can be mounted p-side up. The light source 315 can be soldered to electrical contacts or pads on the surface of the optics mount 305. The electrical contacts can provide electrical current to the light source 315. In some implementations, the light source 315 can be a distributed feedback laser. A distributed feedback laser is a type of laser with an active region that includes a diffraction grating. The grating can reflect light at a particular wavelength to form the resonator. Distributed feedback lasers can be susceptible to interference from external light, however. For example, any light reflected back from the optical grating coupler can interfere with the laser and cause it to become unstable. Therefore, in some implementations, the optics mount 305 can include an optical isolator 325. The optical isolator 325 can pass the light beam 360 in a first direction, but block any light from passing in the reverse direction back toward the light source 315. For example, the optical isolator 325 can block light reflecting back from the interface between free space and the optics mount 305, the interface between the optics mount 305 and the PIC 310, and/or the surface of the grating coupler 330 and redirected by the mirror 335 back towards the light source 315. In some implementations, the optical isolator can be a latching garnet Faraday rotator-based micro-optical isolator.

The lens 320 can include a lens or a lens assembly for focusing the light beam 360 onto the grating coupler 330 either directly or indirectly (via one or more reflections). The lens can be mounted on the optics mount 305 using epoxy 350. In some implementations, the lens 320 can be mounted on the optics mount 305 indirectly via one or more brackets or mounts.

The mirror 335 redirects the light beam 360 towards the optical grating coupler 330. The mirror 335 includes a controllable element that can adjust the tilt or position of a reflective portion of the mirror to set the desired angle of incidence of the light beam 360 on the optical grating coupler 330. In some implementations, the mirror 335 can be a microelectromechanical system (MEMS) mirror. The mirror 335 can include one or more actuators that can adjust the tilt or position of the reflective portion of the mirror 335 based on a supplied voltage or current. In some implementations, the tilt or position of the reflective portion can be adjusted about one axis. In some implementations, the tilt or position of the reflective portion can be adjusted about two orthogonal or nearly orthogonal axes. Tilting of the reflective portion may be substantially rotational, but may also include a degree of incidental vertical or lateral movement due to interactions between actuators and supporting elements. The reflective portion of the mirror 335 can receive the light beam 360 via free space (i.e., air or other gas), and redirect it through the same. When the beam of light 360 enters the optics mount 305, however, it can experience refraction due to the change in refractive index. For example, the refractive index of air is very close to 1, while the refractive index of silicon can be approximately 3.5. In some implementations, the anti-reflective (AR) coating 340 can include one or more layers of materials with indices of refraction between that of silicon and air; for example, the multi-layer hard oxide coating described previously. The angle of the mirror 335 as well as its position relative to the optical grating coupler 330 can be set to take into account this refraction and ensure the light beam 360 focuses on the optical grating coupler 330. The mirror 335 is described in more detail below with regard to FIG. 5.

The PIC 310 includes the optical grating coupler 330, which receives the light beam 360 from the mirror 335. The PIC 310 can include a modulator for modulating the continuous wave light beam 360 coupled into the optical grating coupler 330. The modulated signal can exit the PIC 310 as the optical signal 365 conveying data across an optical link. The PIC 310 and its components are described in detail below with regard to FIG. 4.

The controller 370 can include programmable logic such as a field-programmable gate array (FPGA), a microcontroller, or a microprocessor. The controller 370 can be integral with, or external to the integrated optical assembly 300. The controller 370 can include a memory and interfaces for interacting with other components of the integrated optical assembly 300. The controller 370 can include interfaces for receiving commands and transmitting status information via display, audio, input, and networking devices. The controller 370 can aid in performing adjustment or calibration operations involving positioning of the mirror 335. In some implementations, the controller 370 can include drivers (not shown) for providing analog voltage signals to the mirror 335 for controlling the position of the reflective portion of the mirror 335. In some implementations, the drivers for providing the analog voltage signals can be physically separate from the controller 370, and either adjacent to or integrated with the mirror 335. In some implementations, the drivers can include digital-to-analog convertor (DAC) for converting a digital signal from the controller 370 into an analog voltage suitable for controlling the position of the reflective portion of the mirror 335. In some implementations, the drivers can include voltage amplifiers for amplifying relatively low-voltage (e.g., several volts) control and/or logic signals from the controller 370 to the relatively higher voltage (e.g., tens of volts) used to control electrostatic actuators of the mirror 335. In some implementations, the drivers can include current amplifiers for actuating magnetic actuators. The current amplifier can convert digital or analog voltages into currents adequate for magnetic actuation of the reflective portion of the mirror 335 (e.g., tens or hundreds of milliamps).

Figure 4:
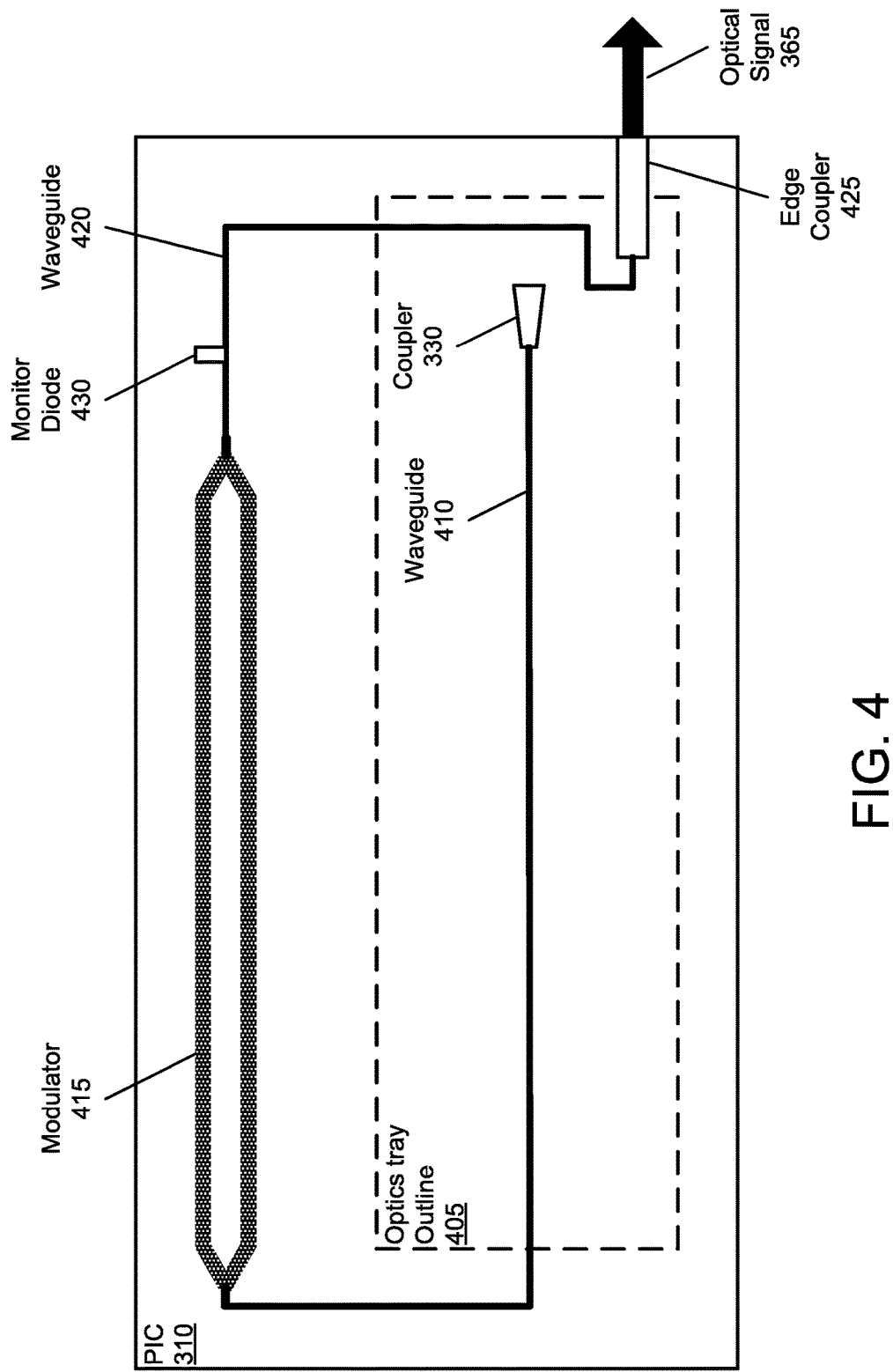
FIG. 4 is a block diagram of a photonic integrated circuit (PIC) for use in an integrated optical assembly, according to an illustrative implementation.

FIG. 4 is a block diagram of a photonic integrated circuit (PIC) 310 for use in an integrated optical assembly 300, according to illustrative implementations. In the assembly 300, the PIC 310 can be positioned underneath the optics mount 305. The outline 405 represents the outline of the optics mount 305 relative to the PIC 310 in this example implementation. Electrical connections are omitted for clarity.

The PIC 310 can receive the light beam 360 at the optical grating coupler 330. The optical grating coupler 330 couples the light beam 360 into the waveguide 410. The waveguide 410 conveys the light to the modulator 415, which modulates the continuous-wave light to create and optical signal that can be used to transmit data. The waveguide 420 receives the modulated optical signal from the output of the modulator 415 and conveys it to an edge coupler 425 adjacent to a side of the PIC 310. The edge coupler 425 can transmit the optical signal 365 into another medium; for example, an optical fiber or another waveguide external to the PIC 310.

In some implementations, the PIC 310 can include means for measuring the amplitude of light coupled into the optical grating coupler 330. For example, the PIC 310 can include a monitor photodiode 430. The monitor photodiode 430 can include a light-sensitive device such as a photodiode, which can convert an optical signal received from a tap on the waveguide 410 or 420 to an electrical signal that varies in relation to the amplitude of the optical signal. In some implementations, the modulator 415 can have two output waveguides. In such implementations, each output waveguide can have a separate monitor photodiode 430. The signals of the respective monitor photodiodes 430 can be summed. The controller 370 can receive the electrical signal [s] and use it to determine the efficiency of coupling light into the optical grating coupler 330. The controller 370 can further provide voltages or currents to set a position of the mirror 335. Using the electrical signal from the monitor photodiode 430 as feedback, the controller 370 can adjust the position of the mirror 335 to achieve a certain angle of incidence of the light beam 360 on the optical grating coupler 330. The controller can adjust mirror 335 position, and by extension the angle of incidence, to increase the efficiency of coupling light into the optical grating coupler 330.

In some implementations, the integrated optical assembly 300 can include a tap on the waveguide output of the modulator 415. An additional grating coupler or edge coupler can receive light from the tap and direct it to an external monitor photodiode. The controller 370 can receive an electrical signal from the external monitor photodiode and use it to determine the efficiency of coupling of the light beam 360 into the PIC 310.

In some implementations, the integrated optical assembly 300 can include one or more additional monitor photodiodes on the optics mount 305. This additional monitor photodiode can be positioned adjacent to the light source 315 to provide direct measurements of performance that are decoupled from mechanical shifts of intermediary components such as the lens 320, isolator 325, and mirror 335, as well as changes in alignment between the optics mount 305 and the PIC 310. These measurements can be helpful to, for example, monitor the health of the light source 315 to detect degradation of output power over time. The additional monitor photodiode can be used in place of external monitor photodiodes during the burn-in manufacturing step of the optics mount 305 assembly process.

FIG. 5A is a diagram of a two-axis microelectromechanical system (MEMS) mirror assembly 500 for use in an integrated optical assembly, according to an illustrative implementation. The mirror assembly 500 includes three main components: a mirror platform 505, a gimbal 510, and a mirror substrate 515. The mirror platform 505, gimbal 510, and mirror substrate 515 are disposed above a base substrate (not shown). The mirror platform 505 can include a reflective surface and/or coating on its upper side. The mirror assembly 500 includes actuators for moving the components. In the implementation shown in FIG. 5A, the mirror assembly 500 can be actuated in two dimensions. The actuators 520a and 520b (collectively "actuators 520") can move the mirror platform 505 with respect the gimbal 510, and the actuators 525a and 525b (collectively "actuators 525") can move the gimbal 510 and the mirror platform 505 with respect to the mirror substrate 515.

In some implementations, the actuators 520 and 525 can apply torque to their inner component. For example, the actuators 520 can apply torque to rotate the mirror platform 505 to cause rotation in the X-Z plane (i.e., about the Y-axis), and the actuators 525 can apply torque to rotate the gimbal 510 to cause rotation in the Y-Z plane (i.e., about the X-axis). In this manner, the actuators 520 and the actuators 525 can move the mirror platform 505 about a first axis and a second axis, respectively, where the axes are substantially orthogonal to each other.

In some implementations, the actuators 520 and 525 can be vertical comb-drive electrostatic actuators. Each actuator 520 and 525 can have a first part and a second part; for example, the actuators 520 can have a left side and a right side, and the actuators 525 can have a top side and a bottom side, as oriented in the drawing. A first voltage applied to the first part of the actuator can cause the actuator to move the mirror platform 505 in a first direction. In some implementations, the first direction can be a rotational direction about an axis of motion of the mirror platform 505. A second voltage applied to the second part of the actuator can cause the actuator to move the mirror platform in a second direction opposite the first direction. For example, the first voltage applied to the first part of the actuators 520a may cause the mirror platform 505 to move clockwise around the Y-axis, and the second voltage applied to the second part of the actuators 520a may cause the mirror platform 505 to move counterclockwise around the Y-axis.

FIG. 5B is a diagram of a single-axis microelectromechanical system (MEMS) mirror assembly 550 for use in an integrated optical assembly, according to an illustrative implementation. The mirror assembly 550 includes a mirror platform 555 suspended in or over a cavity defined in a mirror substrate 565 by a torsion beam 570. The torsion beam 570 allows the mirror platform 555 to move rotationally in one dimension; i.e., the Y-Z plane. The mirror platform 555 can include a reflective layer or surface on its top side. The mirror platform 555 can rotate relative to the mirror substrate 565 under the influence of one or more actuators (not shown). In some implementations, the mirror platform 555 can be positioned with the aid of one or more external drivers. An external driver may include an electrostatic, piezo, thermal, or magnetic actuator. The actuators can receive a control voltage or current and set a position of the mirror platform 555. In some implementations, the mirror assembly 550 can be miniaturized. For example, the mirror assembly 550 can be embodied in a discrete device having dimensions less than a millimeter in the x, y, and z directions. In some implementations, the mirror assembly 550 can be a discrete device having dimensions less than 0.75 mm in the x, y, and z directions.

In some implementations, the mirror platform 555 can be positioned via means external to the mirror assembly 550. For example, a rod or hook can be used to adjust the position of the mirror platform 555 while coupling of light into the PIC 310 is monitored. In some implementations, the mirror platform 555 can be moved using magnetic forces.

FIG. 6 is a flowchart of an example method 600 of manufacturing an integrated optical assembly, according to an illustrative implementation. The method 600 includes providing an optics mount having disposed thereon a light source for providing a beam of light and a lens configured to focus the beam of light (stage 610). The method 600 includes providing a photonic integrated circuit (PIC) having disposed thereon a grating coupler for receiving the beam of light and coupling the beam of light into a waveguide (stage 620). The method 600 includes providing a microelectromechanical systems (MEMS) mirror configured to receive the beam of light from the lens and redirect it towards the grating coupler (stage 630). The method 600 includes assembling the optics mount, the MEMS mirror, and the PIC into the integrated optical assembly (stage 640). In some implementations, the method 600 includes calibrating he position of the MEMS mirror to increase coupling of the beam of light into the waveguide (stage 650).

The method 600 includes providing an optics mount having disposed thereon a light source for providing a beam of light and a lens configured to focus the beam of light (stage 610). The optics mount can be similar to the optics mount 305 described with respect to FIG. 3. Likewise, the light source can be similar to the light source 315, and the lens can be similar to the lens 320. The light source 315 can be bonded or otherwise mounted to the optics mount 305 using a solder 345 or adhesive. The lens 320 can be fixed to the optics mount 305 via a combination of an adhesive and/or a bracket or mount. The light source 315 and lens 320 are arranged such that the light source 315 can direct a beam of light towards the lens 320.

The method 600 includes providing a photonic integrated circuit (PIC) having disposed thereon a grating coupler for receiving the beam of light and coupling the beam of light into a waveguide (stage 620). The PIC can be similar to the PIC 310 described with respect to FIGS. 3 and 4. Likewise, the grating coupler can be similar to the optical grating coupler 330.

The method 600 includes providing a microelectromechanical systems (MEMS) mirror configured to receive the beam of light from the lens and redirect it towards the grating coupler (stage 630). The mirror can be similar to the mirror 335 described with respect to FIG. 3, including the mirror assemblies 500 and 550 described with respect to FIG. 5. The mirror 335 can be mounted or attached to the optics mount 305. In some implementations, the mirror 500 or 550 can include one or more actuators for adjusting a position of the MEMS mirror to affect an angle of incidence of the beam of light on the grating coupler 330.

The method 600 includes assembling the optics mount, the MEMS mirror, and the PIC into the integrated optical assembly (stage 640). The optics mount 305 and the PIC 310 can be joined and bonded using an adhesive such as epoxy or solder balls applied via a solder shooter, or by mechanical fasteners such as bolts or clamps. The mirror 335 can be joined to the optics mount 305 and/or the PIC 310. The mirror 335 can be fixed in position such that it can receive the light beam 360 from the light source 315 and lens, and redirect the light beam 360 through the optics mount 305 to the optical grating coupler 330 on the PIC 310. During the assembly stage, it is important to properly align the optics mount 305 and the PIC 310 in the X-Y plane to achieve alignment between the light beam 360 and the optical grating coupler 330, which may be as small as several microns in each dimension. In some implementations, a focused spot size of the light beam 360 can be approximately 10 μm in diameter. In some implementations, alignment may be performed visually by activating the light source 315 and observing the point of incidence of the light beam 360. In some implementations, alignment may be performed using feedback from the monitor photodiode 430 to measure optical coupling.

In some implementations, the method 600 includes calibrating the position of the MEMS mirror to increase coupling of the beam of light into the waveguide (stage 650). In some implementations, the light source 315 can be activated, and the mirror 335 adjusted to direct the light beam 360 onto the optical grating coupler 330. A position and/or tilt of a reflective portion of the mirror 335 can be adjusted to set an angle of incidence of the light beam 360 on the optical grating coupler 330. The angle of incidence can be adjusted to increase coupling of the light beam 360 into the grating coupler 330.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An integrated optical assembly comprising:
    an optics mount having disposed thereon a light source for providing a beam of light and a lens configured to focus the beam of light;
    a photonic integrated circuit (PIC) mechanically coupled to the optics mount and having disposed thereon a grating coupler for receiving the beam of light and coupling the beam of light into a waveguide; and
    a microelectromechanical systems (MEMS) mirror configured to receive the beam of light from the lens and redirect it towards the grating coupler, wherein a position of a reflective portion of the MEMS mirror is adjustable to affect an angle of incidence of the beam of light on the grating coupler, and the MEMS mirror can rotate in two dimensions.

2. The integrated optical assembly of claim 1, wherein the grating coupler includes silicon.

3. The integrated optical assembly of claim 1, wherein the optics mount includes silicon with an anti-reflective coating on at least one surface.

4. The integrated optical assembly of claim 1, wherein the light source is a distributed feedback laser.

5. The integrated optical assembly of claim 4, comprising:
    an optical isolator disposed on the optics mount and configured to receive the beam of light from the lens and pass it in a first direction towards the MEMS mirror while preventing light from passing through it in a second direction opposite the first direction.

6. The integrated optical assembly of claim 1, comprising:
    a monitor photodiode disposed on the PIC for measuring an amplitude of light coupled into the waveguide.

7. The integrated optical assembly of claim 1, wherein the MEMS mirror is movable to adjust the angle of incidence from zero degrees from normal to a light-receiving surface of the grating coupler, to 20 degrees from normal.

8. The integrated optical assembly of claim 1, wherein the optics mount is less than 5 mm long, 1.25 mm wide, and 1.5 mm tall, and the PIC is less than 1.25 mm tall, 1.25 mm wide, and 6 mm long.

9. The integrated optical assembly of claim 1, wherein the MEMS mirror includes an actuator for adjusting the position of the reflective portion.

10. The integrated optical assembly of claim 1, wherein the MEMS mirror is configured to be continually or periodically repositioned throughout a service life of the integrated optical assembly.

11. An optical communication system comprising:
an optics mount having disposed thereon a light source for providing beam of light and a lens configured to focus the beam of light;
a photonic integrated circuit (PIC) mechanically coupled to the optics mount and having disposed thereon:
a grating coupler for receiving the beam of light and coupling the beam of light into a waveguide, and
a monitor photodiode for measuring an amplitude of light coupled into the waveguide;
a microelectromechanical systems (MEMS) mirror configured to receive the beam of light from the lens and redirect it towards the grating coupler, wherein a position of a reflective portion of the MEMS mirror is adjustable to affect an angle of incidence of the beam of light on the grating coupler, and the MEMS mirror can rotate in two dimensions; and
a controller configured to receive an indication of the amplitude of the light coupled into the waveguide and control the position of the MEMS mirror to increase the indication of the amplitude.

12. The integrated optical assembly of claim 11, wherein the grating coupler includes silicon.

13. The integrated optical assembly of claim 11, wherein the optics mount includes silicon with an anti-reflective coating on at least one surface.

14. The integrated optical assembly of claim 11, wherein the light source is a distributed feedback laser.

15. The integrated optical assembly of claim 11, comprising:
an optical isolator disposed on the optics mount and configured to receive the beam of light from the lens and pass it in a first direction towards the MEMS mirror while preventing light from passing through it in a second direction opposite the first direction.

16. A method of manufacturing an integrated optical assembly comprising:
providing an optics mount having disposed thereon a light source for providing beam of light and a lens configured to focus the beam of light;
providing a photonic integrated circuit (PIC) having disposed thereon a grating coupler for receiving the beam of light and coupling the beam of light into a waveguide; and
providing a microelectromechanical systems (MEMS) mirror configured to receive the beam of light from the lens and redirect it towards the grating coupler, wherein a position of a reflective portion of the MEMS mirror is adjustable to affect an angle of incidence of the beam of light on the grating coupler, and the MEMS mirror can rotate in two dimensions; and
assembling the optics mount, the MEMS mirror, and the PIC into the integrated optical assembly.

17. The method of claim 16, comprising:
providing a modulator on the PIC for modulating light coupled into the waveguide.

18. The method of claim 16, comprising:
providing a monitor photodiode on the PIC; and
measuring, using the monitor photodiode, an amplitude of light coupled into the waveguide.

19. The method of claim 18, comprising:
calibrating, using the measured amplitude, the position of the MEMS mirror to increase coupling of the beam of light into the waveguide.

* * * * *